United States Patent
Aigner et al.

(10) Patent No.: US 10,288,018 B2
(45) Date of Patent: May 14, 2019

(54) MOTOR VEHICLE HAVING AN AIR INTAKE SYSTEM FOR IMPROVED TRAVEL THROUGH WATER

(71) Applicant: Bayerische Motoren Werke Aktiengesellschaft, Munich (DE)

(72) Inventors: Tobias Aigner, Sillertshausen (DE); Stefan Koerber, Markt Indersdorf (DE); Barbara Dick, Weilheim (DE); Johannes Maier, Tuntenhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/796,911

(22) Filed: Oct. 30, 2017

(65) Prior Publication Data

US 2018/0066615 A1 Mar. 8, 2018

Related U.S. Application Data

(63) Continuation of application No. PCT/EP2016/064011, filed on Jun. 17, 2016.

(30) Foreign Application Priority Data

Jul. 29, 2015 (DE) .................. 10 2015 214 313

(51) Int. Cl.
*F02M 35/08* (2006.01)
*B60K 13/02* (2006.01)
(Continued)

(52) U.S. Cl.
CPC .......... *F02M 35/088* (2013.01); *B60K 13/02* (2013.01); *F02M 35/10013* (2013.01);
(Continued)

(58) Field of Classification Search
CPC ............... F02M 35/10; F02M 35/088; F02M 35/10118; F02M 35/161; F02M 35/024; B60K 13/02
See application file for complete search history.

(56) References Cited

U.S. PATENT DOCUMENTS 6,302,228 B1 10/2001 Cottereau et al.
6,510,832 B2 * 1/2003 Maurer ............ F02M 35/10013
123/198 E
(Continued)

FOREIGN PATENT DOCUMENTS

DE 44 08 097 A1 9/1995
DE 197 10 056 A1 9/1998
(Continued)

OTHER PUBLICATIONS

German-language Office Action issued in counterpart German Application No. 10 2015 214 313.9 dated Apr. 22, 2016 (6 pages).
(Continued)

*Primary Examiner* — Brian L Swenson
(74) *Attorney, Agent, or Firm* — Crowell & Moring LLP

(57) ABSTRACT

A motor vehicle has an air intake system with an air duct. The air duct has an air inlet for taking in ambient air and an air outlet. The air duct has a curved bent section which, upstream, is closer to a vehicle running surface than downstream. In the event of a water level of water entering the air duct that is rising parallel to the vehicle running surface, the internal cross section of the bent section is closed by the water before the water can pass the bent section. A plurality of air openings downstream of the bent section is introduced through a wall of the duct in an outer surface of the duct that points away from the vehicle running surface.

11 Claims, 2 Drawing Sheets

(51) Int. Cl.
*F02M 35/16* (2006.01)
*F02M 35/10* (2006.01)
*F02M 35/024* (2006.01)

(52) U.S. Cl.
CPC .... *F02M 35/10118* (2013.01); *F02M 35/161* (2013.01); *F02M 35/168* (2013.01); *F02M 35/024* (2013.01)

(56) References Cited

U.S. PATENT DOCUMENTS

| | | | | |
|---|---|---|---|---|
| 7,234,555 | B2* | 6/2007 | Khouw | B60K 13/02 180/68.3 |
| 7,455,042 | B2* | 11/2008 | Jacobi-Hinderer | F02M 35/10013 123/184.21 |
| 8,485,153 | B2 | 7/2013 | Satarino et al. | |
| 8,540,043 | B2* | 9/2013 | Mehlos | F02M 35/161 180/68.1 |
| 8,911,523 | B2* | 12/2014 | Marx | B60H 1/28 123/198 E |
| 9,062,639 | B1* | 6/2015 | MacKenzie | F02M 35/161 |
| 9,982,638 | B2* | 5/2018 | Wadi | F02M 35/10262 |
| 2004/0011011 | A1 | 1/2004 | Storz et al. | |
| 2004/0031247 | A1* | 2/2004 | Darnell | B01D 45/04 55/319 |
| 2006/0006012 | A1 | 1/2006 | Khouw et al. | |
| 2010/0032220 | A1 | 2/2010 | Ohira et al. | |
| 2012/0085307 | A1 | 4/2012 | Siber et al. | |
| 2014/0150384 | A1* | 6/2014 | Bunnell | F02M 35/088 55/332 |
| 2015/0151606 | A1* | 6/2015 | Harke | B60H 1/00321 55/434.2 |

FOREIGN PATENT DOCUMENTS

| | | | |
|---|---|---|---|
| DE | 198 35 104 | A1 | 2/2000 |
| DE | 103 04 028 | A1 | 10/2003 |
| DE | 10 2007 020 454 | A1 | 11/2008 |
| DE | 10 2010 047 851 | A1 | 4/2012 |
| DE | 10 2013 017 183 | A1 | 4/2015 |
| EP | 0 982 168 | A1 | 3/2000 |
| EP | 1 350 945 | A2 | 10/2003 |
| FR | 2 929 341 | A1 | 10/2009 |
| FR | 2 929 342 | A1 | 10/2009 |
| JP | 58-187575 | A | 11/1983 |

OTHER PUBLICATIONS

International Search Report (PCT/ISA/210) issued in PCT Application No. PCT/EP2016/064011 dated Aug. 19, 2016 with English translation (5 pages).
German-language Written Opinion (PCT/ISA/237) issued in PCT Application No. PCT/EP2016/064011 dated Aug. 19, 2016 (6 pages).

* cited by examiner

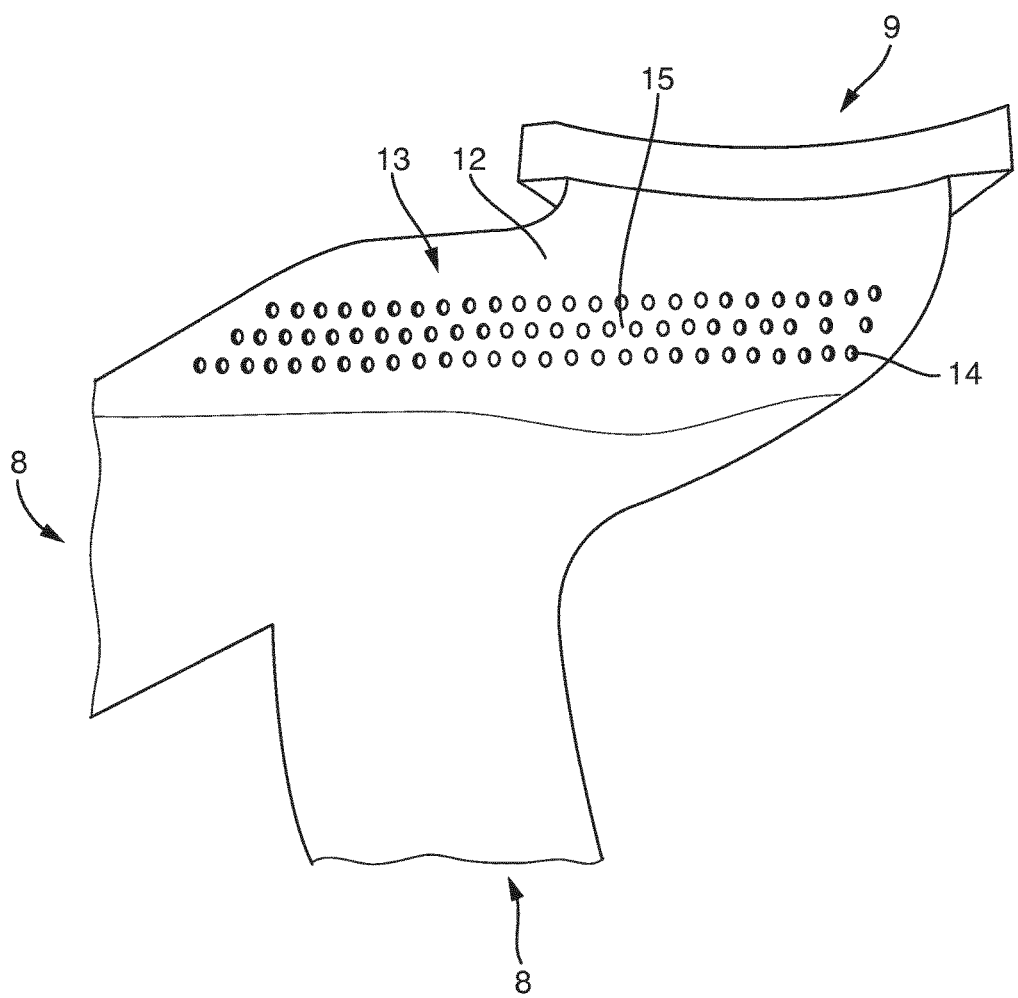

MOTOR VEHICLE HAVING AN AIR INTAKE SYSTEM FOR IMPROVED TRAVEL THROUGH WATER

CROSS REFERENCE TO RELATED APPLICATIONS

This application is a continuation of PCT International Application No. PCT/EP2016/064011, filed Jun. 17, 2016, which claims priority under 35 U.S.C. § 119 from German Patent Application No. 10 2015 214 313.9, filed Jul. 29, 2015, the entire disclosures of which are herein expressly incorporated by reference.

BACKGROUND AND SUMMARY OF THE INVENTION

The invention concerns a motor vehicle with an air intake system for drawing in air from the surroundings.

It is necessary for motor vehicles to be able to drive through water, such as flood water, with a particular water level, without water getting into the internal combustion engine through the air intake system. This might otherwise result in engine damage, a so-called water hammer.

In all-terrain vehicles, so-called snorkels are known, by which air can be optionally taken in when driving through water. Such snorkels even allow a crossing of streams. However, these snorkels are separate air intake ducts, which are provided in addition to the air duct typically used and provided in the engine compartment. But such snorkels cannot be used for normal road cars, nor are they needed, since these require instead provisions for water accumulation in the event of heavy rainfall.

One problem which the invention proposes to solve is to provide a motor vehicle with an air intake system for improved travel through water. This problem is solved with a motor vehicle according to embodiments of the invention.

According to an exemplary embodiment of the invention, a motor vehicle is provided, with an air intake system having an air duct, comprising an air inlet for taking in ambient air and an air outlet, wherein the air duct has a curved bent section which is closer to a vehicle running surface upstream than downstream. In the event of a water level of water entering the air duct that is rising parallel to the vehicle running surface, the internal cross section of the bent section is closed by the water before the water can pass the bent section. A plurality of air openings downstream of the bent section are introduced through a wall of the air duct in an outer surface of the air duct pointing away from the vehicle running surface.

The terms "upstream" and "downstream" refer to an intended direction of air flow in the air duct, i.e., "downstream" is the direction inside the air duct from the air inlet to the air outlet, and "upstream" is the reverse direction from the air outlet to the air inlet. The term "vehicle running surface" pertains to a plane which contains the bearing surfaces of the tires of the motor vehicle against the ground. If the vehicle is standing on level ground, then the vehicle running surface corresponds to the surface on which the vehicle is standing. With this embodiment, a solution is provided in which an air duct has alternative air openings by which air can be drawn in to supply the internal combustion engine when the normally used air inlet of the air duct is closed by water on account of driving through water. Furthermore, the air duct is shaped so that a rising water level when driving through water closes the internal cross section of the air duct before the water passes the air duct. This creates a partial vacuum downstream from the closed site, which in turn strengthens the intake of air through the air openings.

According to another embodiment of the invention, the motor vehicle is modified such that the air duct has a highest point, which is a point on the outer surface of the air duct which is furthest away from a vehicle running surface. The air duct has an emergency intake zone which is formed by a wall of the air duct situated on the side away from the vehicle running surface of an imaginary plane running parallel to the vehicle running surface and 1 cm below the highest point. At least some of the air openings are arranged in the emergency intake zone. By placing the air openings in the region of the highest point of the air duct, water entry through the air openings can be better prevented.

According to another embodiment of the invention, all of the air openings are situated in the emergency intake zone.

According to another embodiment of the invention, the bent section has a narrowing of its cross section. Thanks to this narrowing, the air duct has a steep rising shape in the front region, by which water entry can be prevented longer in an event of a rising water level.

According to another embodiment of the invention, the narrowing of the cross section is situated such that the internal cross section area at the cross narrowing of the section is further away from the vehicle running surface than all other internal cross section areas of the bent section.

According to another embodiment of the invention, the motor vehicle moreover comprises an air filter device, which is arranged downstream from the air duct.

According to another sample embodiment of the invention, the outer surface of the air duct is arched outward in a region containing the emergency intake zone.

According to another embodiment of the invention, between the outwardly arched region containing the emergency intake zone and the bent section, the outer surface of the air duct facing away from the vehicle running surface is curved with an opposite direction of curvature to that of the bent section.

According to another embodiment of the invention, the air duct is the sole air duct of the motor vehicle for air supply to an internal combustion engine.

According to another embodiment of the invention, the entire air duct is arranged beneath the engine hood of the motor vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a top view of the air duct.

DETAILED DESCRIPTION OF THE DRAWINGS

Figure 1:
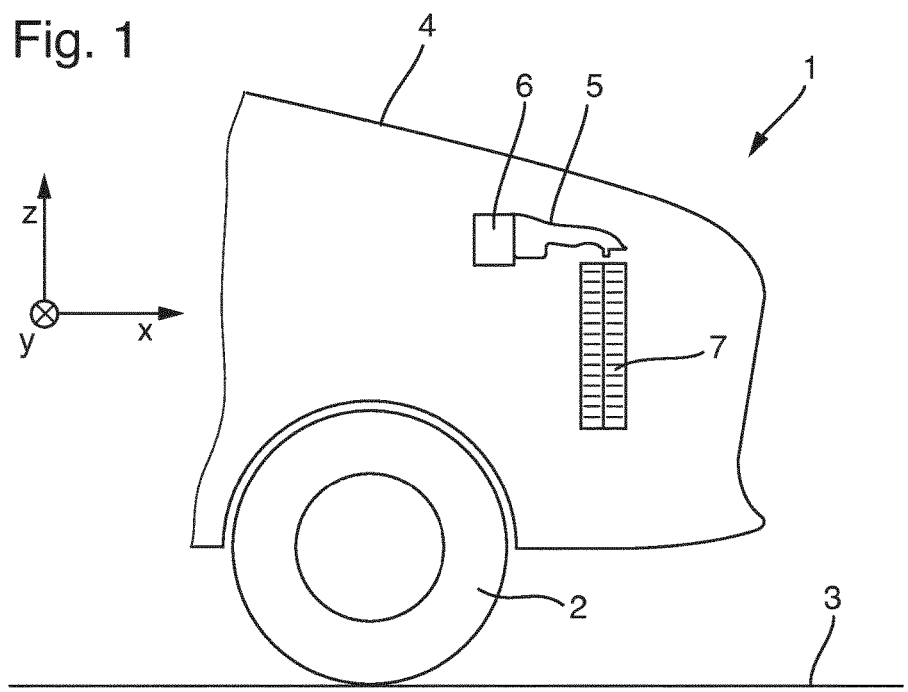
FIG. 1 is a schematic view of a motor vehicle with an air intake system according to an exemplary embodiment of the invention.

FIG. 1 is a schematic view of a motor vehicle with an air intake system according to one sample embodiment of the invention. The motor vehicle 1 has tires 2, the bearing surfaces of the tires of the motor vehicle against the ground forming a vehicle running surface 3. If the motor vehicle is standing on level ground, the vehicle running surface 3 then corresponds to the surface on which the motor vehicle is standing. A right-angled coordinate system as drawn in FIG. 1 indicates a longitudinal axis of the vehicle as the x axis, a transverse direction of the vehicle as the y axis, and a vertical axis of the vehicle as the z axis. Thus, an xy plane of this coordinate system is parallel to the vehicle running surface 3. Beneath an engine hood 4 of the motor vehicle 1 is housed the air intake system, which comprises an air duct 5 and an air filter device 6, such as an air filter. Furthermore, beneath the air duct 5 is arranged a radiator grille 7. The air duct 5 is arranged beneath the engine hood 4 and in the upper region of the engine compartment. At its top side, the air duct 5 is provided with air openings 14 (see FIG. 3), which shall be explained in greater detail below. According to the invention, a solution is provided in which air to be supplied to the internal combustion engine can be drawn in through the air openings when a normally used air inlet 8 (see FIG. 2) of the air duct is closed by water on account of driving through water. Furthermore, the air duct 5 is formed such that a rising water level when driving through water closes the internal cross section of the air duct before the water passes through the air duct. In this way, a partial vacuum is created downstream from the closed site, which in turn strengthens the intake of air through the air openings 14.

Figure 2:
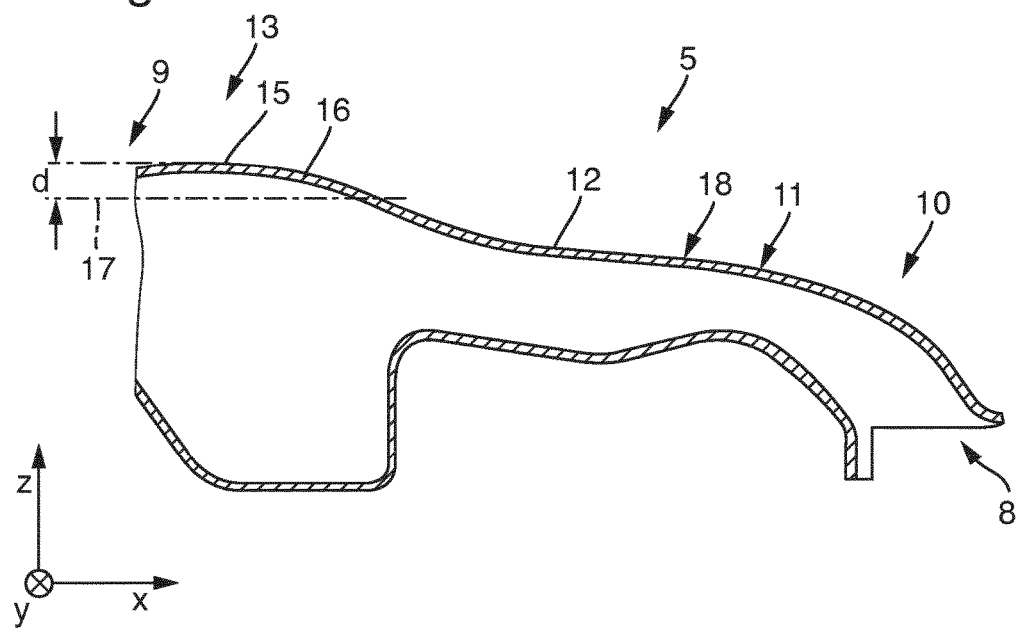
FIG. 2 shows the air duct of the motor vehicle of FIG. 1 in greater detail.

FIG. 2 shows the air duct of the motor vehicle of FIG. 1 in greater detail. The air duct 5 has at least one air inlet 8 and one air outlet 9. It shall be explained further below, making reference to FIG. 3, that two air inlets 8 may also be provided. Referring to an air flow during operation, "downstream" indicates the direction inside the air duct 5 from the air inlet 8 to the air outlet 9 and "upstream" indicates the reverse direction from the air outlet 9 to the air inlet 8. The air duct 5 is preferably made of plastic, but it may also be made of any other suitable material. The air duct 5 has a bent section 10, which is curved toward the vehicle running surface 3 within an xz plane. In the exemplary embodiment depicted, the upstream end of the bent section 10 is formed by the air inlet 8, but this need not necessarily be the case. In particular, the bent section 10 is curved such that the air inlet 8 is open toward the vehicle running surface 3. In the downstream direction, the air duct 5 rises from the air inlet 8 against the vehicle longitudinal direction (i.e., toward the rear) and in the z direction (i.e., upward) and narrows to a cross section narrowing 11 of the internal cross section. After the cross section narrowing 11, the bent section 10 terminates and the internal cross section again widens. Downstream and adjacent to the bent section 10, an outer surface 12 of the air duct 5 is curved with a direction of curvature on the side of the air duct 5 facing the vehicle running surface 3 opposite the curvature of the bent section 10. Directly adjoining this, the outer surface 12 of the air duct 5 is then again arched outwardly, i.e., with the same direction of curvature as the bent section 10. This latter region forms the downstream end of the air duct 5 and is closed by the air outlet 9.

In an emergency intake zone 13 there are provided air openings 14 (see FIG. 3). The emergency intake zone 13 is provided around the highest point 15 (i.e., the point on the outer surface 12 of the air duct 5 which is the furthest away from the vehicle running surface 3). More precisely, the emergency intake zone 13 is formed by a wall 16 of the air duct 5 situated on the side away from the vehicle running surface 3 of an imaginary plane 17 which runs parallel to the vehicle running surface 3 and at a distance d below the highest point 15. The distance d is preferably 1 cm, even more preferably 0.5 cm, but it may also be 0.25 cm. At least some of the plurality of air openings 14 are arranged within this emergency intake zone. The air openings 14 are openings through the wall 16 of the air duct 5, preferably boreholes. The diameter of the air openings is in particular 1 to 6 mm. Preferably, all air openings 14 have the same diameter.

The bent section 10 is configured such that at one end 18 of the bent section 10 a cross section stands substantially perpendicular to the cross section at the air inlet 8. The "cross section" of the air duct refers to the cross section perpendicular to a center line of the internal space of the air duct.

It is contemplated for the air openings 14 to be closed by a device which opens the air openings only upon driving through water and/or when water enters the air inlet. In this way, air is only drawn in through the air openings when this is required. The device may automatically open the air opening at a particular pressure difference. This might be, for example, a membrane placed on the inside. It is also contemplated for the device to open the air opening in response to a water sensor.

FIG. 3 shows a top view of the air duct 5. As can be seen, in this embodiment the air openings 14 are arranged in three parallel rows, each row having a plurality of air openings 14. Of course, this is only an example and other arrangements of the air openings 14 are possible. Moreover, one can see that the air duct 5 is branched between the emergency intake zone 13 and the bent section 10, so that it has two air inlets 8. Each of the branches is designed as described above, i.e., having the bent section 10. The reason for this branching and the associated two air inlets 8 is of an acoustical nature. In practice, air is drawn in through both air inlets 8 in the case of four-cylinder engines. In three-cylinder engines, one of the air inlets 8 is closed, so that only one of the air inlets 8 is used here.

LIST OF REFERENCE SIGNS

1 motor vehicle
2 tires
3 vehicle running surface
4 engine hood
5 air duct
6 air filter device
7 radiator grille
8 air inlet
9 air outlet
10 bent section
11 narrowing of the cross section
12 outer surface
13 emergency intake zone
14 air openings
15 highest point of air duct
16 wall
17 imaginary plane
18 end of bent section The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with an air intake system, comprising:
an air duct comprising an air inlet for taking in ambient air and an air outlet, wherein the air duct has a curved bent section which is closer to a vehicle running surface upstream than downstream and is configured such that in an event of a water level of water entering the air duct that is rising parallel to the vehicle running surface, an internal cross section of the bent section is closed by the water before the water can pass the bent section, a plurality of air openings downstream of the bent section are provided in a wall of the air duct in an outer surface of the air duct pointing away from the vehicle running surface, and the plurality of air openings are openable only upon driving the motor vehicle through the water and/or when the water enters the air inlet.

2. The motor vehicle as claimed in claim 1, wherein the bent section has a narrowing of its cross section.

3. The motor vehicle as claimed in claim 1, further comprising:
an air filter device arranged downstream from the air duct.

4. The motor vehicle as claimed in claim 1, wherein the air duct is the sole air duct of the motor vehicle for air supply to the internal combustion engine.

5. The motor vehicle as claimed in claim 1, wherein the entire air duct is arranged beneath an engine hood of the motor vehicle.

6. A motor vehicle with an air intake system, comprising:
an air duct comprising an air inlet for taking in ambient air and an air outlet, wherein
the air duct has a curved bent section which is closer to a vehicle running surface upstream than downstream and is configured such that in an event of a water level of water entering the air duct that is rising parallel to the vehicle running surface, an internal cross section of the bent section is closed by the water before the water can pass the bent section,
a plurality of air openings downstream of the bent section are provided in a wall of the air duct in an outer surface of the air duct pointing away from the vehicle running surface,
the air duct has a highest point, which is a point on the outer surface of the air duct which is furthest away from the vehicle running surface,
the air duct has an emergency intake zone which is formed by a wall of the air duct situated on the side away from the vehicle running surface of an imaginary plane running parallel to the vehicle running surface and 1 cm below the highest point, and
at least some of the plurality of air openings are located in the emergency intake zone.

7. The motor vehicle as claimed in claim 6, wherein all of the plurality of air openings are located in the emergency intake zone.

8. The motor vehicle as claimed in claim 7, wherein the outer surface of the air duct is arched outward in a region containing the emergency intake zone.

9. The motor vehicle as claimed in claim 6, wherein the outer surface of the air duct is arched outward in a region containing the emergency intake zone.

10. The motor vehicle as claimed in claim 9, wherein between the outwardly arched region containing the emergency intake zone and the bent section, the outer surface of the air duct facing away from the vehicle running surface is curved with an opposite direction of curvature to that of the bent section.

11. A motor vehicle with an air intake system, comprising:
an air duct comprising an air inlet for taking in ambient air and an air outlet, wherein
the air duct has a curved bent section which is closer to a vehicle running surface upstream than downstream and is configured such that in an event of a water level of water entering the air duct that is rising parallel to the vehicle running surface, an internal cross section of the bent section is dosed by the water before the water can pass the bent section,
a plurality of air openings downstream of the bent section are provided in a wall of the air duct in an outer surface of the air duct pointing away from the vehicle running surface,
the bent section has a narrowing of its cross section, and
the narrowing of the cross section is situated such that an internal cross section area at the narrowing of the cross section is further away from the vehicle running surface than all other internal cross section areas of the bent section.

* * * * *